(12) United States Patent
Totsuka

(10) Patent No.: US 11,082,577 B2
(45) Date of Patent: Aug. 3, 2021

(54) IMAGE FORMING APPARATUS, CONTROL METHOD, AND NON-TRANSITORY COMPUTER READABLE MEDIUM

(71) Applicant: CANON KABUSHIKI KAISHA, Tokyo (JP)

(72) Inventor: Satoshi Totsuka, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/348,844

(22) Filed: Nov. 10, 2016

(65) Prior Publication Data

US 2017/0134601 A1 May 11, 2017

(30) Foreign Application Priority Data

Nov. 11, 2015 (JP) .............................. JP2015-221392

(51) Int. Cl.
*G06F 15/00* (2006.01)
*H04N 1/00* (2006.01)
*G06F 3/12* (2006.01)
*H04N 1/23* (2006.01)
*H04N 1/34* (2006.01)

(52) U.S. Cl.
CPC ....... *H04N 1/00917* (2013.01); *G06F 3/1205* (2013.01); *G06F 3/1258* (2013.01); *H04N 1/2376* (2013.01); *H04N 1/344* (2013.01); *H04N 2201/0094* (2013.01)

(58) Field of Classification Search
CPC .. H04N 1/00917; H04N 1/2376; H04N 1/344; G06F 3/1205; G06F 3/1258
USPC ....................................................... 358/1.15
See application file for complete search history.

(56) References Cited

U.S. PATENT DOCUMENTS

| 8,836,965 | B2* | 9/2014 | Yamada | G06F 3/121 |
| | | | | 358/1.14 |
| 2009/0316179 | A1* | 12/2009 | Amiya | G06Q 20/145 |
| | | | | 358/1.14 |
| 2012/0050783 | A1* | 3/2012 | Osuki | G06F 3/1204 |
| | | | | 358/1.14 |
| 2013/0208292 | A1* | 8/2013 | Akari | G06F 3/121 |
| | | | | 358/1.13 |
| 2014/0340702 | A1* | 11/2014 | Maki | G06F 3/1285 |
| | | | | 358/1.14 |
| 2015/0181065 | A1* | 6/2015 | Aizono | G06Q 20/409 |
| | | | | 358/1.14 |

FOREIGN PATENT DOCUMENTS

JP 2006-212799 A 8/2006

* cited by examiner

*Primary Examiner* — Mark R Milia
(74) *Attorney, Agent, or Firm* — Canon U.S.A., Inc. IP Division

(57) ABSTRACT

An image forming apparatus includes a printing unit that performs printing based on a job, a setting unit that sets a setting specifying whether billing is to be performed for printing performed by the printing unit, and a control unit that, in a case where printing performed by the printing unit is interrupted due to occurrence of a job interruption event, if a setting specifying that billing is not to be performed is set by the setting unit, executes cancellation of the job when a predetermined time period elapses without a cause of the interruption being cleared and, if a setting specifying that billing is to be performed is set by the setting unit, does not execute the cancellation.

14 Claims, 6 Drawing Sheets

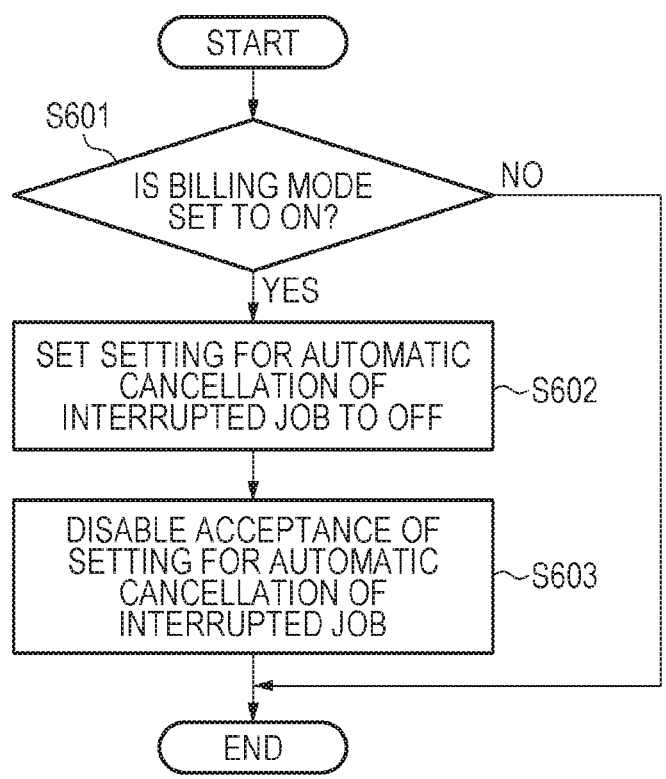

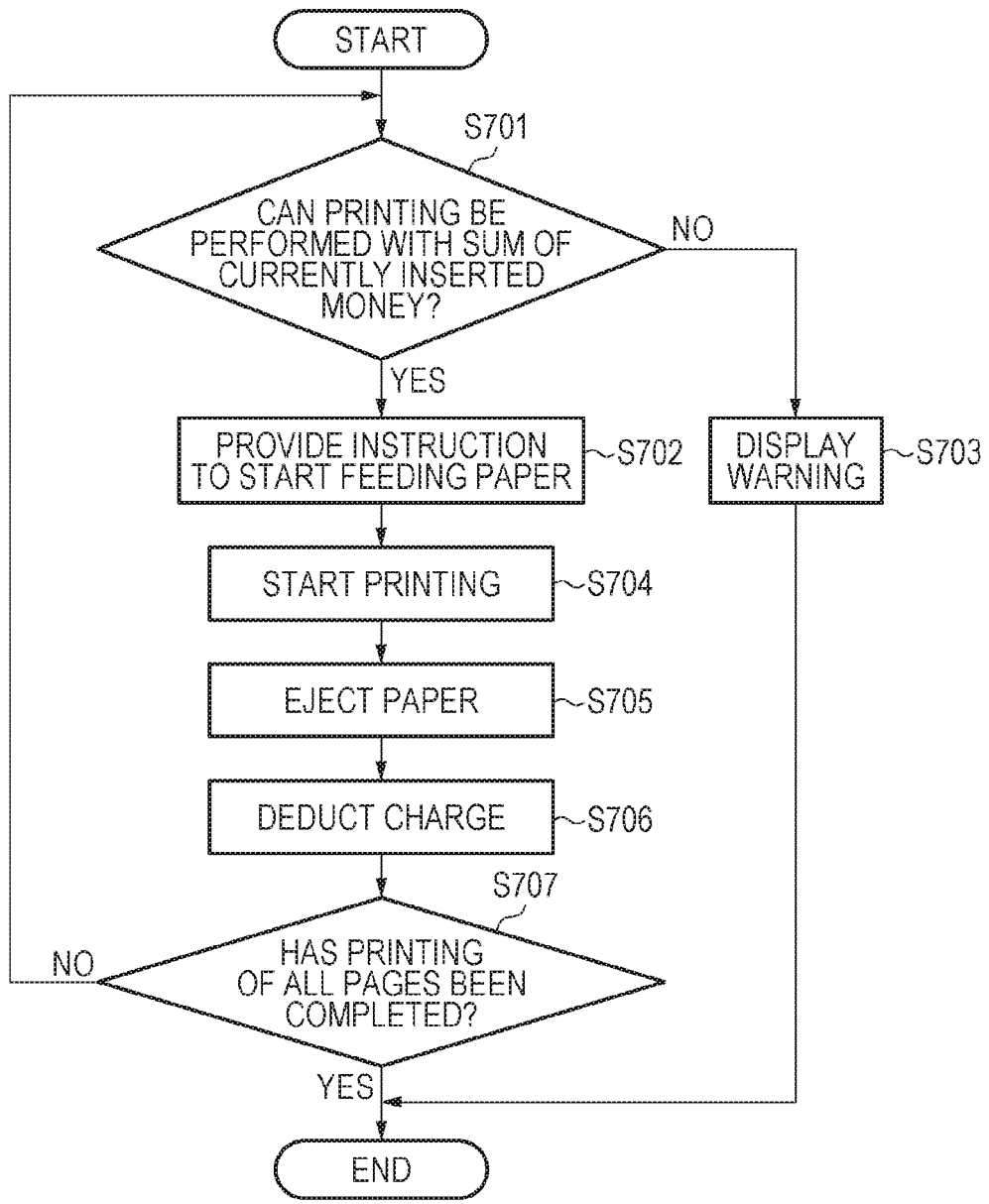

IMAGE FORMING APPARATUS, CONTROL METHOD, AND NON-TRANSITORY COMPUTER READABLE MEDIUM

BACKGROUND OF THE INVENTION

Field of the Invention

The present invention relates to an image forming apparatus that performs printing on the basis of a job, a control method, and a non-transitory computer readable medium.

Description of the Related Art

In office environments, work has been carried out where a plurality of users submit a print job from their respective host computers by using a printer driver or the like to perform printing. In such work, as methods for dealing with the case where a printing apparatus is stopped due to an error, such as a paper jam, Japanese Patent Laid-Open No. 2006-212799 discloses a method in which an error is cleared to resume a print job without turning off an image forming apparatus and a method in which a print job is cancelled at the time of occurrence of an error.

There is a system in which a billing management device for coins, prepaid cards, or the like is connected to an image forming apparatus and in which a billing process for a printing process, such as copying, is performed. Such a system is used for, for example, a case where a printing service is provided to a large number of unspecified users in a store, such as a convenience store, or a case where the number of sheets of printing paper used within a company is managed for each department individually.

In the above-described method in which a print job is resumed, there is a security issue in that, in an environment where a plurality of print jobs are submitted, a highly confidential document may be seen by other persons if another person performs recovery work. In a method in which a print job is automatically cancelled at the time of occurrence of an error, such an issue does not occur.

Here, in the case of the system in which a billing process is performed, a user is presumed to move away from the image forming apparatus to add paper or toner after an error occurs and before a job is cancelled. In such a case, when a job is automatically cancelled, an unused portion of the payment made for the cancelled job is unintentionally used by another person.

SUMMARY OF THE INVENTION

In view of such existing issues, one or more aspects of the present invention are directed to an image forming apparatus that controls execution of cancellation of a job interrupted due to the occurrence of a job interruption event in accordance with a setting specifying that a billing process is to be performed, a control method, and a non-transitory computer readable medium.

In response to the above issues, an image forming apparatus according to one or more aspects of the present invention includes a printing unit configured to perform printing based on a job, a setting unit configured to set a setting specifying whether billing is to be performed for printing performed by the printing unit, and a control unit configured, in a case where printing performed by the printing unit is interrupted due to occurrence of a job interruption event, if a setting specifying that billing is not to be performed is set by the setting unit, to execute cancellation of the job when a predetermined time period elapses without a cause of the interruption being cleared and, if a setting specifying that billing is to be performed is set by the setting unit, not to execute the cancellation.

Further features of the present invention will become apparent from the following description of exemplary embodiments with reference to the attached drawings.

BRIEF DESCRIPTION OF THE DRAWINGS

FIG. 6 is a flowchart illustrating a process of controlling execution of job cancellation.

FIG. 7 is a flowchart illustrating a printing process performed in the billing mode.

DESCRIPTION OF THE EMBODIMENTS

Figure 1:
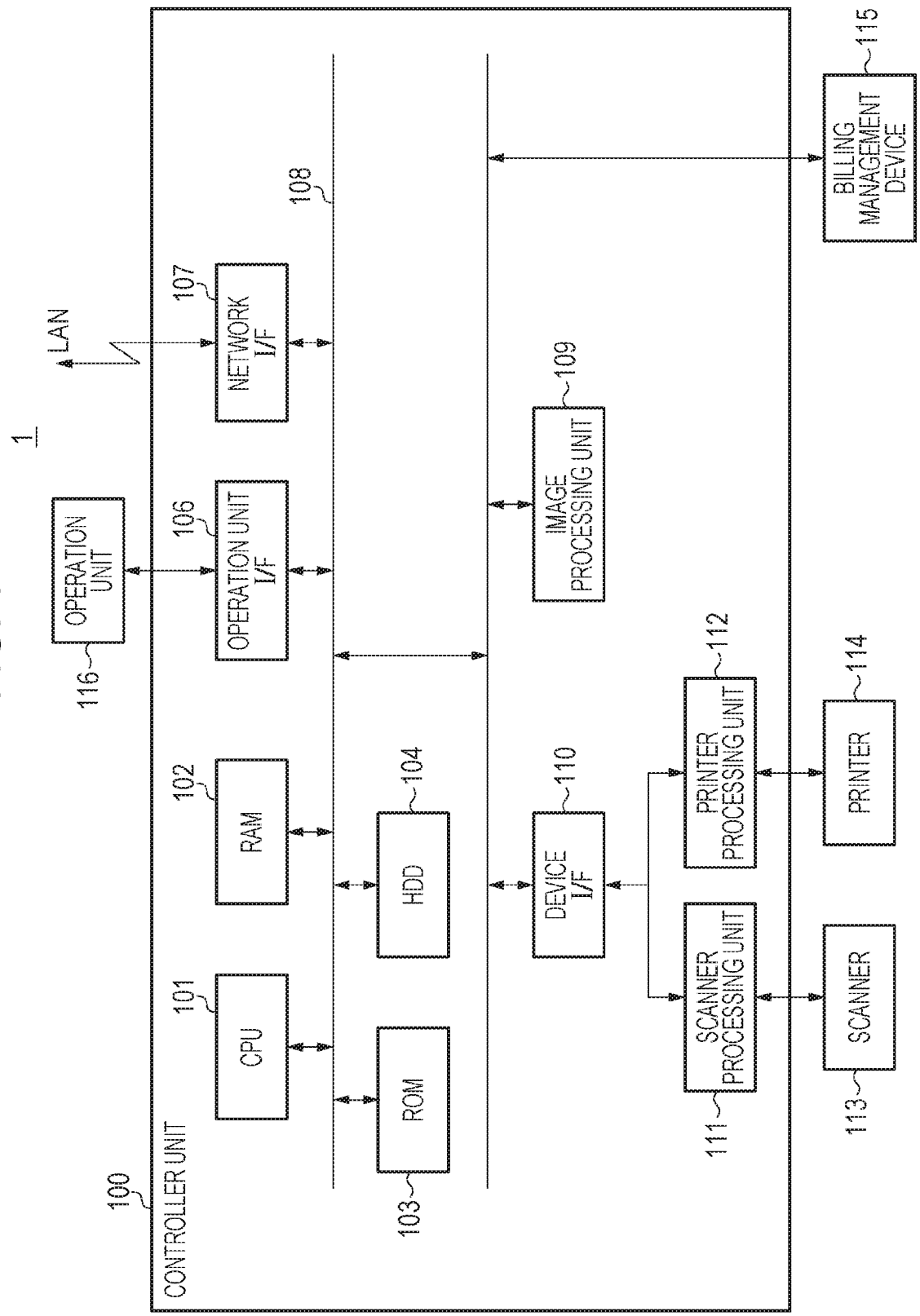
FIG. 1 is a block diagram illustrating the configuration of an image forming apparatus.

Embodiments of the present invention will be described in detail below with reference to the accompanying drawings. Note that the following embodiments are not intended to limit the invention according to the claims and that all combinations of features to be described in the embodiments are not necessarily essential to the invention. The same components are designated by the same reference numerals, and repeated descriptions thereof are omitted.

First Embodiment

FIG. 1 is a block diagram illustrating the configuration of an image forming apparatus. In a first embodiment, as illustrated in FIG. 1, an image forming apparatus 1 is implemented as a multifunction peripheral (MFP) into which a plurality of functions, such as a scan function and a print function, are integrated. The image forming apparatus 1 includes a controller unit 100 that controls the entire apparatus, a scanner 113, a printer 114, and an operation unit 116. The image forming apparatus 1 is connected to a billing management device 115. The scanner 113 is an image input device that optically scans an image on a placed original document. The printer 114 is an image output device that prints an image on a recording medium, such as printing paper, on the basis of image data. The operation unit 116 includes, for example, a numeric keypad and various hard or physical keys for accepting inputs of an instruction to execute a job or the like from a user. The operation unit 116 further includes a display panel that displays, to the user, apparatus information, progress information of a job, and the like, or a settings screen for a function executable by the image forming apparatus 1.

The scanner 113 and the printer 114 are respectively connected to a scanner processing unit 111 and a printer processing unit 112 that are included in the controller unit 100. The operation unit 116 is connected to an operation unit interface (I/F) 106 included in the controller unit 100. In this configuration, the scanner 113, the printer 114, and the operation unit 116 are controlled by the controller unit 100 and operate.

The billing management device 115 is connected to a system bus 108 of the controller unit 100. In the case where the image forming apparatus 1 operates in a billing mode, the billing management device 115 notifies a central processing unit (CPU) 101 via the system bus 108 of information on the amount of coins or the amount of money on a prepaid card inserted into the billing management device 115. The CPU 101 of the controller unit 100 notifies the billing management device 115 of, for example, billing information corresponding to output produced by the printer 114. The billing management device 115 performs a billing process (for example, deduction of a charge from the amount of coins or the amount of money on the prepaid card) corresponding to the output.

The controller unit 100 includes the CPU 101 that performs centralized control of each block of the controller unit 100. The CPU 101 is connected to a random access memory (RAM) 102, a read only memory (ROM) 103, a hard disk drive (HDD) 104, the operation unit I/F 106, and a network interface (I/F) 107 via the system bus 108. The RAM 102, which is a general-purpose RAM, is a memory for providing a work area for the CPU 101. Furthermore, the RAM 102 is used as a memory for temporarily storing, for example, parameters or settings, and also as an image memory for storing image data in certain units, such as, units of pages. The ROM 103, which is a general-purpose ROM, serves as a boot ROM and stores a system boot program, for example. The HDD 104 stores a system software program, history data, image data, tables, and others. A function of the image forming apparatus 1 is implemented by, for example, causing the CPU 101 to read a program stored in the ROM 103 into the RAM 102 and execute the program.

The operation unit I/F 106 is an interface for input/output of information between the CPU 101 and the operation unit 116. The operation unit I/F 106 outputs display data to the operation unit 116 in accordance with an instruction from the CPU 101, and also transmits information input by the user through the operation unit 116 to the CPU 101. The network I/F 107 is connected to a local area network (LAN) 105, which is a wired or wireless medium, and enables input/output of information between the image forming apparatus 1 and a device on the LAN 105. The network I/F 107 has a configuration corresponding to the LAN 105. For example, in some cases, the network I/F 107 has a configuration corresponding to near-field communication in which a wireless communication range is about several tens of centimeters. In this case, the image forming apparatus 1 and a mobile wireless terminal communicate with each other.

An image processing unit 109 performs general-purpose image processing. For example, the image processing unit 109 performs processing, such as scaling, rotation, or conversion, on image data acquired externally via the LAN 105. The image processing unit 109 also performs processing in which a page description language (PDL) code received via the LAN 105 is converted into a bitmap image. Furthermore, in the case where output is produced by the printer 114 via the printer processing unit 112, the image processing unit 109 performs processing for converting compressed encoded image data stored in the HDD 104 into a format processible by the printer processing unit 112. A device interface (I/F) 110 is connected to the scanner 113 and the printer 114 via the scanner processing unit 111 and the printer processing unit 112. The device I/F 110 performs synchronous or asynchronous conversion of image data and transmits settings, adjustment values, and the like. Furthermore, the device I/F 110 transmits state information of the scanner 113 or the printer 114 to the CPU 101. The state information contains, for example, error information, such as a paper jam occurring in the scanner 113 or the printer 114.

The scanner processing unit 111 performs various processes corresponding to scan functions, such as correction, processing, image segmentation, magnification, and a binarization process, on data scanned and input by the scanner 113. The scanner 113 includes an automatic document feeder that successively feeds original document sheets and a platen scan device, which are not illustrated, and can perform scanning of an original document placed on a platen glass and double-sided scanning of original document sheets, for example. Furthermore, the scanner 113 includes sensors that detect, for example, an open or closed state of a document cover, which is not illustrated, the presence or absence of an original document, and the size of an original document. Detection signals of these sensors and state information of the scanner 113 are transmitted to the CPU 101 via the scanner processing unit 111 and the device I/F 110, and the CPU 101 identifies a state, such as error occurrence or error clearing in the scanner 113.

The printer processing unit 112 performs processes corresponding to print functions, such as output correction corresponding to output characteristics of the printer 114, resolution conversion, and adjustment of a print position of an image, on image data to be printed out. The printer 114 includes at least one paper feed cassette for holding printing paper. The printer 114 includes sensors that detect, for example, a remaining amount of paper in each paper feed cassette, and the presence or absence of toner. Detection signals from the sensors and state information of the printer 114 are transmitted to the CPU 101 via the printer processing unit 112 and the device I/F 110, and the CPU 101 identifies a state, such as error occurrence or error clearing in the printer 114.

Figure 2:
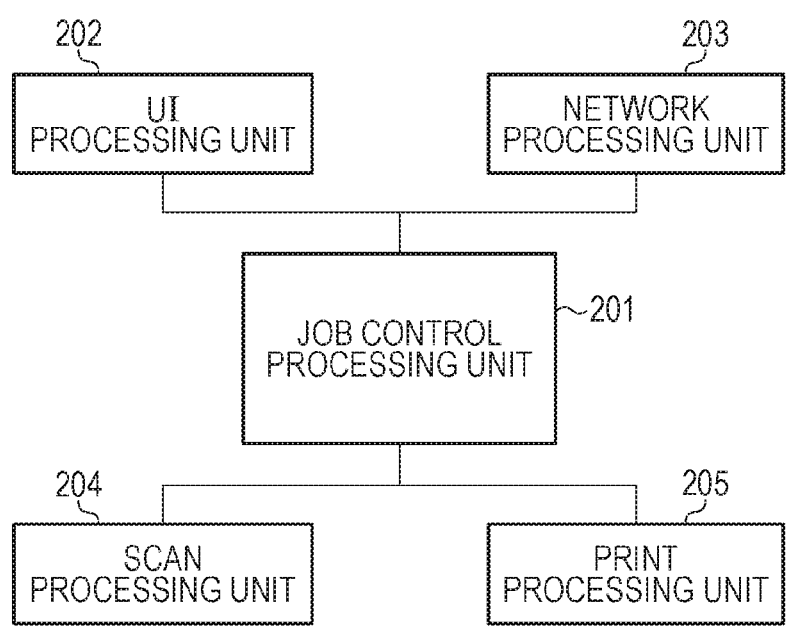
FIG. 2 illustrates a software module configuration of the image forming apparatus.

FIG. 2 illustrates a software module configuration of the image forming apparatus 1. Each module illustrated in FIG. 2 is implemented by causing the CPU 101 to execute a program. A job control processing unit 201 controls other modules and performs centralized control of execution of jobs occurring in the image forming apparatus 1, such as copying, printing, scanning, and user interface (UI) processing.

A UI processing unit 202 performs processes regarding the operation unit 116 and the operation unit I/F 106. The UI processing unit 202 transmits information input by the user through the operation unit 116 to the job control processing unit 201 and also causes the operation unit 116 to display a display screen in accordance with an instruction from the job control processing unit 201. Furthermore, for example, the UI processing unit 202 edits rendering data to be displayed by the operation unit 116.

A network processing unit 203 performs a communication process with a device on the LAN 105 via the network I/F 107. When the network processing unit 203 receives a control command or data from a device on the LAN 105, the network processing unit 203 transmits its information to the job control processing unit 201. Furthermore, the network processing unit 203 transmits a control command or data to a device on the LAN 105 in accordance with an instruction from the job control processing unit 201.

A scan processing unit 204 controls and causes the scanner 113 and the scanner processing unit 111 to perform a process of scanning an original document placed on the scanner 113 in accordance with an instruction from the job control processing unit 201. The scan processing unit 204 controls and causes the scanner processing unit 111 to perform image processing on scanned image data. Furthermore, the scan processing unit 204 acquires state information of the scanner processing unit 111 and the scanner 113 and transmits the state information to the job control processing unit 201.

A print processing unit 205 controls and causes the image processing unit 109, the printer processing unit 112, and the printer 114 to perform a printing process in accordance with an instruction from the job control processing unit 201. The print processing unit 205 receives, from the job control processing unit 201, information, such as image data, image information (for example, image data size, color mode, and resolution), layout information (for example, offset, scaling, and pagination), and output paper information (for example, size and printing, orientation). Then, the print processing unit 205 controls and causes the image processing unit 109 and printer processing unit 112 to perform appropriate image processing on image data and controls and causes the printer processing unit 112 and the printer 114 to perform a printing process onto printing paper. Furthermore, the print processing unit 205 acquires state information of the printer processing unit 112 and the printer 114 and transmits the state information to the job control processing unit 201.

Next, print control performed when the image forming apparatus 1 is in a billing mode will be described. The image forming apparatus 1 operates in a billing mode in accordance with a setting set on a settings screen to be described. The billing mode is a mode in which billing is performed for the amount of execution of a job. If the job control processing unit 201 determines, from setting information, that the billing mode is set, the job control processing unit 201 notifies the print processing unit 205 that the billing mode is set. When the print processing unit 205 receives a notification of the billing mode from the job control processing unit 201, before instructing the printer processing unit 112 and the printer 114 to perform a printing process, the print processing unit 205 inquires of the billing management device 115 whether a sum of money with which printing can be performed has been inserted. At this time, the printer processing unit 112 calculates a charge for the amount of execution of a job in certain units (for example, units of pages) with reference to, for example, a billing table and transmits the calculated charge to the billing management device 115. The billing table is a table where an object charged for, such as the type of a recording medium, is associated with a charge amount. The billing table may be stored in the HDD 104 of the image forming apparatus 1, or alternatively may be stored in the billing management device 115 and acquired by the printer processing unit 112 from the billing management device 115 when the image forming apparatus 1 operates in the billing mode.

If the print processing unit 205 receives, from the billing management device 115, a response indicating that a sum of money with which printing can be performed has been inserted, the print processing unit 205 instructs the printer processing unit 112 and the printer 114 to perform a printing process and notifies the billing management device 115 of information on a print result of the printing process. Then, the billing management device 115 performs a billing process for a charge corresponding to the amount of execution of printing (for example, deduction of the charge from the amount of coins or the amount of money on a prepaid card). On the other hand, if the print processing unit 205 receives, from the billing management device 115, a response indicating that a sum of money with which printing can be performed has not been inserted, the print processing unit 205 transmits the response to the job control processing unit 201. The job control processing unit 201 instructs the UI processing unit 202 to cause the operation unit 116 to display a warning indicating a shortage of money.

FIG. 7 is a flowchart illustrating a printing process performed in the billing mode. A process of the flowchart is implemented by, for example, causing the CPU 101 to read a program stored in the HDD 104 into the RAM 102 and execute the program.

In S701, the CPU 101 determines, by using the print processing unit 205, whether printing can be performed with a sum of currently inserted money. If it is determined that printing cannot be performed with a sum of currently inserted money because of a shortage of money, the process proceeds to S703. In S703, the CPU 101 causes, by using the UI processing unit 202, the operation unit 116 to provide a display indicating a shortage of money. After S703, the process in FIG. 7 ends.

If it is determined in S701 that a sum of money with which printing can be performed has been inserted, the CPU 101 controls, by using the print processing unit 205, the printer processing unit 112 and the printer 114 to start feeding paper in S702. In S704, the CPU 101 causes, by using the print processing unit 205, the printer processing unit 112 and the printer 114 to start printing, and printed printing paper is ejected in S705. In S706, the CPU 101 controls, by using the print processing unit 205, the billing management device 115 to deduct a charge for pages corresponding to fed paper sheets.

In S707, the CPU 101 determines, by using the print processing unit 205, whether printing of all pages specified in a job has been completed. If it is determined that printing of all pages has not been completed, the processing steps from S701 are repeated for printing of a subsequent page. On the other hand, if it is determined that printing of all pages has been completed, the process in FIG. 7 ends.

Figure 3:
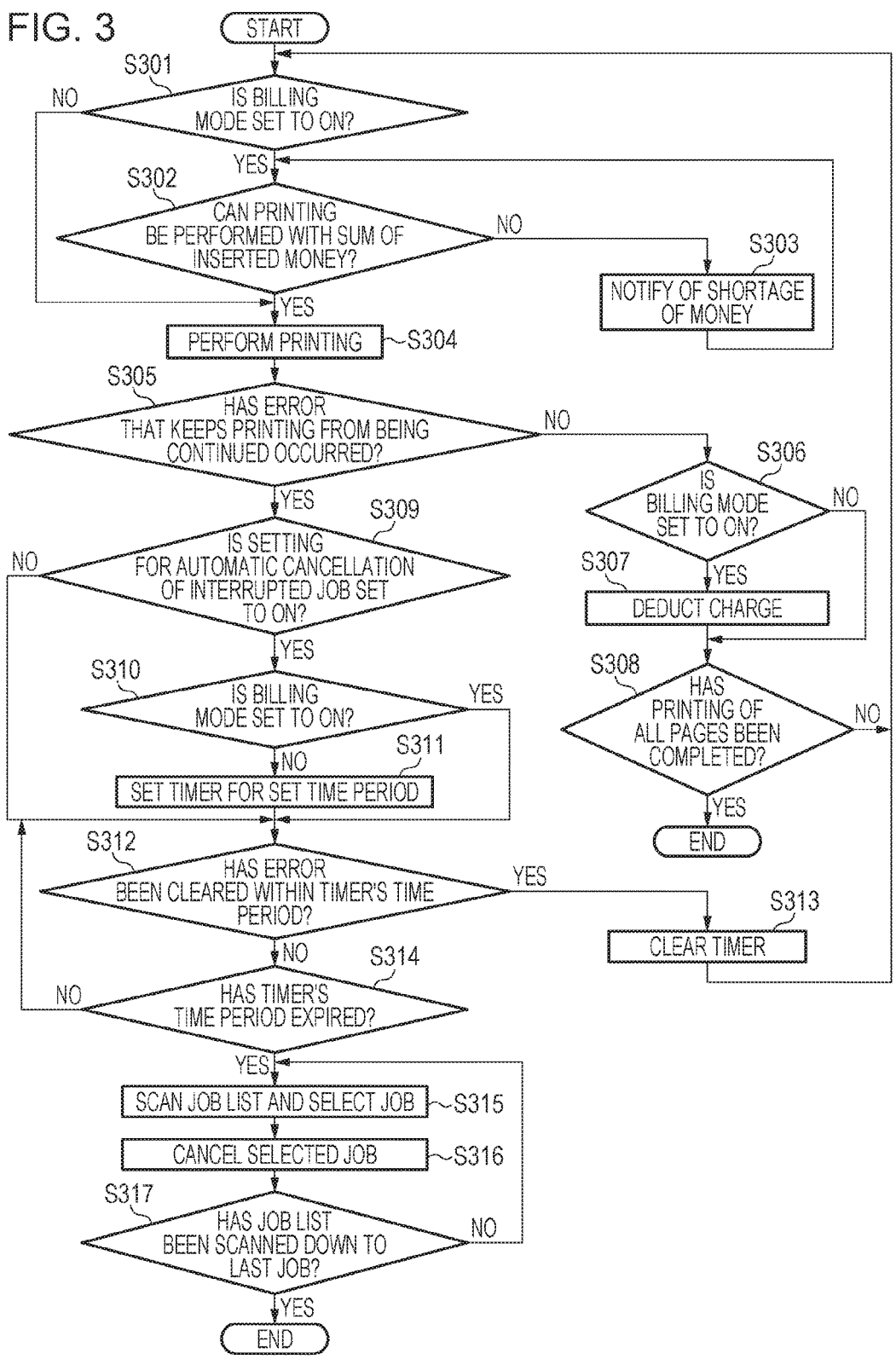
FIG. 3 is a flowchart illustrating a process of controlling execution of job cancellation.

FIG. 3 is a flowchart illustrating a process of controlling execution of job cancellation. In this embodiment, execution of a job cancellation operation in which a job interrupted due to an error, such as a paper jam, is automatically cancelled after a predetermined time period is controlled in accordance with a setting for the billing mode. A process of the flowchart is implemented by, for example, causing the CPU 101 to read a program stored in the HDD 104 into the RAM 102 and execute the program.

In S301, when execution of a print job is started, the CPU 101 determines whether the billing mode of the image forming apparatus 1 is set to ON (enabled). In S301, the CPU 101 makes a determination on the basis of, for example, setting information on a settings screen displayed on the operation unit 116.

Figure 5:
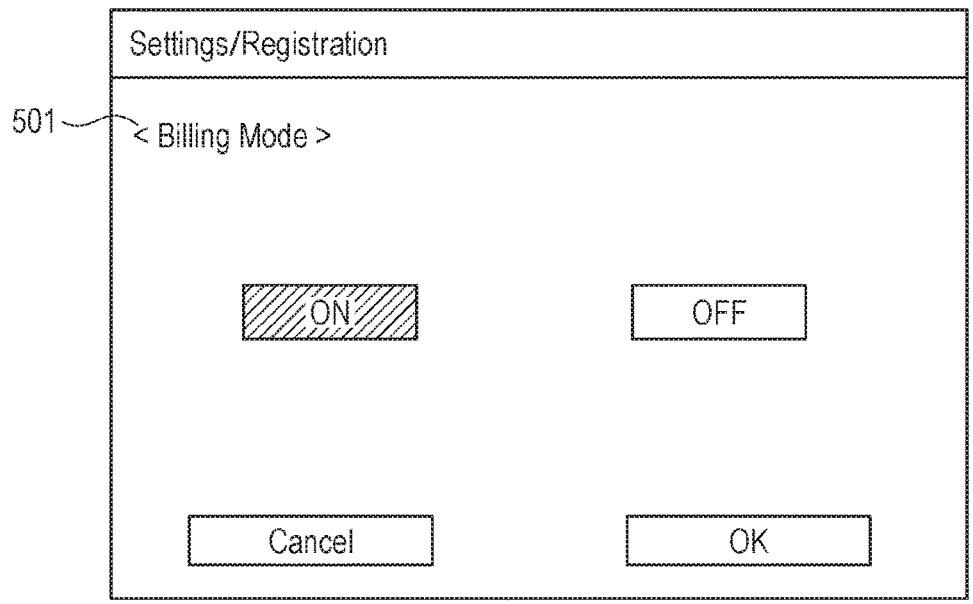
FIG. 5 illustrates a settings screen for a billing mode.

FIG. 5 illustrates an example of a settings screen displayed on the operation unit 116, and the settings screen is a screen for accepting an ON/OFF setting for the billing mode. A setting item 501 is an item for accepting the specification of ON/OFF of the billing mode. When ON is specified for the setting item 501, the billing mode of the image forming apparatus 1 is enabled. When "OFF" is specified for the setting item 501, the billing mode of the image forming apparatus 1 is disabled. When the user presses an OK button, the setting accepted through the settings screen illustrated in FIG. 5 is established and stored in the HDD 104 or the RAM 102. When the user presses a Cancel button, the setting accepted through the settings screen illustrated in FIG. 5 is cancelled.

If it is determined in S301 that the billing mode is set to ON, the CPU 101 determines in S302 whether printing can be performed with a sum of currently inserted money. If it is determined that printing cannot be performed, the CPU 101 proceeds to S303 and causes the operation unit 116 to provide a display indicating a shortage of money until it is determined that printing can be performed by inserting money to make up for the shortage. On the other hand, if it is determined in S302 that printing can be performed, the CPU 101 proceeds to S304. Furthermore, if it is determined in S301 that the billing mode is not set to ON, the CPU 101 proceeds to S304. In S304, the CPU 101 starts a printing process. The processing steps of S302 and S304 respectively correspond to those of S701 and S704 in FIG. 7.

When the printing process is started in S304, the CPU 101 receives error information from the printer 114 via the printer processing unit 112 and the device I/F 110 and thereby determines in S305 whether an error that keeps printing from being continued has occurred.

Examples of an error that keeps printing from being continued include a paperout condition in which a paper feed cassette runs out of paper, a paper jam, and a toner-out condition. When the print processing unit 205 notifies the job control processing unit 201 of error information, the job control processing unit 201 instructs the print processing unit 205 to stop execution of a job. The UI processing unit 202 is notified of the error information from the job control processing unit 201, and an error notification screen corresponding to the error information is displayed on the operation unit 116.

If it is determined in S305 that an error has occurred, the CPU 101 proceeds to S309, and if it is determined that no error has occurred, the CPU 101 proceeds to S306.

In S306, the CPU 101 determines, on the basis of a setting on the settings screen illustrated in FIG. 5, whether the billing mode is set to ON in the image forming apparatus 1. If it is determined that the billing mode is set to ON, the CPU 101 proceeds to S307, and a process of deducting a charge corresponding to the amount of execution of printing is performed. The processing step of S307 corresponds to that of S706 in FIG. 7. On the other hand, if it is determined in S306 that the billing mode is not set to ON, the CPU 101 proceeds to S308.

In S308, the CPU 101 determines whether the printing process has been completed for all pages of the print job. If it is determined that the printing process has been completed for all pages, the process in FIG. 3 ends. On the other hand, if it is determined that the printing process has not been completed for all pages, the processing steps from S301 are repeated for a printing process for a subsequent page.

If it is determined in S305 that an error has occurred, the CPU 101 determines in S309 whether a setting for automatic cancellation of the job (interrupted job) for which the printing process has been interrupted is set to ON. In S309, the CPU 101 makes a determination on the basis of, for example, setting information on a settings screen displayed on the operation unit 116.

Figure 4:
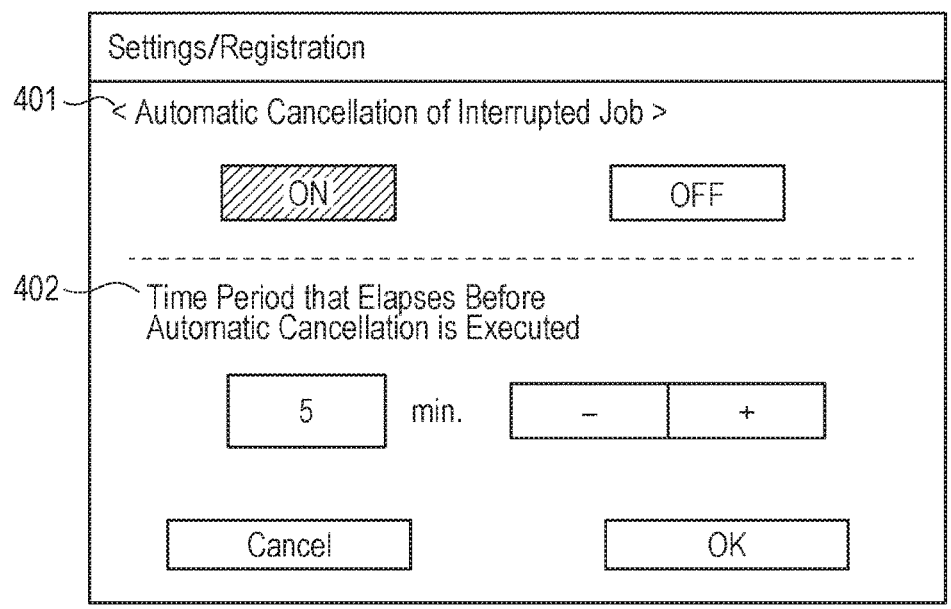
FIG. 4 illustrates a settings screen for automatic cancellation of a job.

FIG. 4 illustrates an example of a settings screen displayed on the operation unit 116, and the settings screen is a screen for accepting an ON/OFF setting for automatic cancellation of a job at the time when a printing process is interrupted due to the occurrence of an error in this embodiment, and a setting of a time period that elapses before automatic cancellation of the job is executed. A setting item 401 is an item for accepting a setting specifying whether to execute cancellation of an interrupted job when a predetermined time period elapses after the occurrence of an error. When "ON" is specified by the user, cancellation of the interrupted job is executed when the predetermined time period elapses after the occurrence of an error. When "OFF" is specified by the user, the cancellation of the interrupted job is not executed.

A setting item 402 is an item for accepting a setting of a time period that elapses before automatic cancellation of a job is executed. In FIG. 4, the user can adjust a value of "5 min." displayed by default with plus and minus buttons. When the user presses an OK button, the settings accepted through the settings screen illustrated in FIG. 4 are established and stored in the HDD 104 or the RAM 102. When the user presses a Cancel button, the settings accepted through the settings screen illustrated in FIG. 4 are cancelled.

If it is determined in S309 that a setting for automatic cancellation of the interrupted job is not set to ON, the CPU 101 proceeds to S312 to wait for error clearing. On the other hand, if it is determined in S309 that a setting for automatic cancellation of the interrupted job is set to ON, the CPU 101 proceeds to S310.

In S310, the CPU 101 determines, on the basis of a setting on the settings screen illustrated in FIG. 5, whether the billing mode is set to ON. If it is determined that the billing mode is set to ON, the CPU 101 proceeds to S312 to wait for error clearing without executing automatic cancellation even if a setting for automatic cancellation of the interrupted job is set to ON in FIG. 4. On the other hand, if it is determined that the billing mode is not set to ON, the CPU 101 proceeds to S311. In S311, the CPU 101 sets a timer for a time period accepted for the setting item 402 in FIG. 4, and the time period is a time period that elapses before automatic cancellation is executed.

In S312, the CPU 101 determines, on the basis of state information received from the printer 114 via the printer processing unit 112 and the device I/F 110, whether the error has been cleared within the timer's time period set in S311. If it is determined that the error has been cleared within the timer's time period, the CPU 101 proceeds to S313, and if it is determined that the error has not been cleared within the timer's time period, the CPU 101 proceeds to S314. Here, if the processing step of S311 is not performed, the CPU 101 simply determines in S312 whether the error has been cleared. Then, if it is determined that the error has been cleared, the CPU 101 proceeds to S313, and if it is determined that the error has not been cleared, the CPU 101 proceeds to S314.

In S313, the CPU 101 clears the timer set in S311. The CPU 101 causes, by using the job control processing unit 201 and the UI processing unit 202, the operation unit 116 to display a screen indicating that the error has been cleared. Then, the CPU 101 causes, by using the job control processing unit 201, the printer processing unit 112 to resume printing. After the processing step of S313, the processing steps from S301 are repeated. Here, if the processing step of S311 is not performed, the processing steps from S301 are repeated without the processing step of S313 being performed.

In S314, the CPU 101 determines whether the timer's time period set in S311 has expired. If it is determined that the timer's time period has expired, the CPU 101 proceeds to S315 to execute automatic cancellation of the job. On the other hand, if it is determined that the timer's time period has not expired, the CPU 101 returns to S312 to accept error clearing with the job being interrupted. Note that, if a setting for automatic cancellation of the interrupted job is not set to ON in S309, or if the billing mode is set to ON in S310, the timer is not set in S311. In this case, the CPU 101 returns from S314 to S312 and determines whether the error has been cleared without making a determination as to the timer's time period.

When the above-described processing steps are performed, in the case of the billing mode, automatic job cancellation operations from S315 are not performed. As a result, this can keep an unused portion of the payment made for a cancelled job from being unintentionally used by another person.

In S315, when the CPU 101 detects, by using the job control processing unit 201, that the time period (timer's time period) that elapses before automatic cancellation is executed has expired, the CPU 101 acquires a list of jobs accepted by this time (that is, the expiration of the timer) (job list). Then, the CPU 101 scans the job list from the top and selects the interrupted job. In S316, the CPU 101 executes, by using the job control processing unit 201, cancellation of the job selected in S315, that is, the interrupted job.

In S317, the CPU 101 determines, by using the job control processing unit 201, whether the job list has been scanned down to the last job, that is, the latest job therein. If it is determined that the job list has not been scanned down to the last job, the CPU 101 selects a subsequent job following the interrupted job in S315 and executes cancellation in S316. On the other hand, if it is determined in S317 that the job list has been scanned down to the last job, the process in FIG. 3 ends.

As described above, according to this embodiment, if execution of a job is interrupted due to the occurrence of an error, when a set timer's time period elapses, the interrupted job, and a job submitted by a point in time when the timer's time period elapses are automatically cancelled. That is, even when an error, such as a paper jam, occurs, a job is not immediately cancelled and is cancelled after a predetermined time period has elapsed. This can reduce a load of resubmitting a job on the user. Furthermore, since job cancellation is executed after a predetermined time period has elapsed, this can reduce a risk that a third person may clear an error and see an output product. In the case where the image forming apparatus 1 is in the billing mode, automatic cancellation of a job is not executed. As a result, this can keep an unused portion of the payment made for a cancelled job from being unintentionally used by another person.

Second Embodiment

Next, in a second embodiment, a difference between the first and second embodiments will be described. In the first embodiment, a setting for the billing mode and a setting for automatic cancellation of a job interrupted due to the occurrence of an error to be executed after a predetermined time period are set separately. In this embodiment, in the case where the billing mode is set to ON, a setting for automatic cancellation of a job interrupted due to the occurrence of an error to be executed after a predetermined time period is set to OFF uniformly.

FIG. 6 is a flowchart illustrating a process of controlling execution of automatic cancellation in accordance with a setting for the billing mode in this embodiment. A process of the flowchart is implemented by, for example, causing the CPU 101 to read a program stored in the HDD 104 into the RAM 102 and execute the program.

In S601, the CPU 101 determines, by using the UI processing unit 202, whether the billing mode is set to ON on the operation unit 116. If it is determined in S601 that the billing mode is set to ON, the CPU 101 proceeds to S602. On the other hand, if it is determined that the billing mode is not set to ON, the process in FIG. 6 ends.

In S602, the CPU 101 sets, by using the UI processing unit 202, a setting for automatic cancellation of a job interrupted due to the occurrence of an error to be executed after a predetermined time period to OFF and stores the setting in the HDD 104 or the RAM 102.

In S603, the CPU 101 controls, by using the UI processing unit 202, a display so that acceptance of a user's setting operation is disabled by hiding a setting item for automatic cancellation of a job interrupted due to the occurrence of an error to be executed after a predetermined time period. As a display control method that disables setting, a setting item may be grayed out, or a pop-up window indicating that setting is disabled may be displayed. Furthermore, in the case where the billing mode is set to OFF, a setting for automatic cancellation of a job interrupted due to the occurrence of an error to be executed after a predetermined time period can be operated by the user.

As described above, according to this embodiment, in the case of the billing mode, an unused portion of the payment made for a cancelled job can be kept from being unintentionally used by another person with increased certainty.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-221392, filed Nov. 11, 2015, which is hereby incorporated by reference herein in its entirety.

What is claimed is:

1. An image forming apparatus, comprising:
one or more controllers, having at least one processor that executes a program or having at least one application specific integrated circuit, configured to function as
a first setting unit configured to set a first mode in which an amount of put money is determined before printing or a second mode in which money is not needed to be put for printing;
a second setting unit configured to set a cancellation mode in which, based on a predetermined time elapsing while an error that hinders execution of a print job that is being executed is not removed, the print job is cancelled;
a cancelling unit configured to cancel, in a case that the cancellation mode has been set by the second setting unit, the print job based on the predetermined time elapsing while the error is not removed; and
a disabling unit configured to disable, based on setting of the first mode by the first setting unit, the cancellation mode set by the second setting unit,
wherein the disabling unit does not disable, based on setting of the second mode by the first setting unit, the cancellation mode set by the second setting unit.

2. The image forming apparatus according to claim 1, wherein the first mode is a mode in which it is determined before the printing whether or not the amount of put money in is enough for the printing.

3. The image forming apparatus according to claim 1, wherein canceling the print job means deleting the print job.

4. The image forming apparatus according to claim 1, wherein the cancellation mode set by the second setting unit is a mode for canceling the print job in response to continuation of the error for predetermined time after the occurrence of the error that inhibits the print job from being executed.

5. The image forming apparatus according to claim 1, wherein the put money is money put to a coin vendor connected to the image forming apparatus.

6. The image forming apparatus according to claim 1, wherein the put money is money put on a prepaid card inserted into a card reader connected to the image forming apparatus.

7. An image forming apparatus, comprising:
one or more controllers, having at least one processor that executes a program or having at least one application specific integrated circuit, configured to function as:
a first setting unit configured to set a first mode in which an amount of put money is determined before printing or a second mode in which money is not needed to be put for printing;
a second setting unit configured to set a cancellation mode in which, based on a predetermined time elapsing while an error that hinders execution of a print job that is being executed is not removed, the print job is cancelled;
a cancelling unit configured to cancel, in a case that the cancellation mode has been set by the second setting unit, the print job based on the predetermined time elapsing while the error is not removed; and
a controlling unit configured to, based on setting of the first mode by the first setting unit, performs control so as not to receive, from a user, setting of the cancellation mode,
wherein the controlling unit is capable of receiving, from the user, setting of the cancellation mode while the second mode has been set by the first setting unit.

8. The image forming apparatus according to claim 7, wherein the first mode is a mode in which it is determined before the printing whether or not the amount of put money in is enough for the printing.

9. The image forming apparatus according to claim 7, wherein canceling the print job means deleting the print job.

10. The image forming apparatus according to claim 7, wherein the cancellation mode set by the second setting unit is a mode for canceling the print job in response to continuation of the error for predetermined time after the occurrence of the error that inhibits the print job from being executed.

11. A method for controlling an image forming apparatus, comprising:
setting a first mode in which an amount of put money is determined before printing or a second mode in which money is not needed to be put for printing;
setting a cancellation mode in which, based on a predetermined time elapsing while an error that hinders execution of a print job that is being executed is not removed, the print job is cancelled;
cancelling, in a case that the cancellation mode has been set by the second setting unit, the print job based on the predetermined time elapsing while the error is not removed;
disabling, based on setting of the first mode, setting of the cancellation mode by a user,
wherein setting of the cancellation mode by the user is not disabled based on setting of the second mode.

12. The method according to claim 11, wherein the billing mode is a mode in which it is determined before the printing whether or not the amount of put money in is enough for the printing.

13. The method according to claim 11, wherein canceling the print job means deleting the print job.

14. The method according to claim 11, wherein the cancellation mode is a mode for canceling the print job in response to continuation of the error for predetermined time after the occurrence of the error that inhibits the print job from being executed.

* * * * *